(12) United States Patent
Olivier, III et al.

(10) Patent No.: US 8,761,933 B2
(45) Date of Patent: Jun. 24, 2014

(54) FINDING A CALLED PARTY

(75) Inventors: Charles F. Olivier, III, Bothell, WA (US); Jean Sebastien Fouillade, Redmond, WA (US); Malek Chalabi, Redmond, WA (US); Nathaniel T. Clinton, Sammamish, WA (US); Russell Sanchez, Seattle, WA (US); Adrien Felon, Seattle, WA (US); Graham Wheeler, Redmond, WA (US); Francois Burianek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 13/195,871

(22) Filed: Aug. 2, 2011

(65) Prior Publication Data

US 2013/0035790 A1 Feb. 7, 2013

(51) Int. Cl.
*G05B 19/04* (2006.01)

(52) U.S. Cl.
USPC .......................... 700/246; 700/245; 700/247

(58) Field of Classification Search
USPC .................. 700/245, 246, 247; 901/1, 46, 47
See application file for complete search history.

(56) References Cited

U.S. PATENT DOCUMENTS

| | | | |
|---|---|---|---|
| 7,014,102 B2 * | 3/2006 | Oohashi ........................ 235/375 |
| 7,228,203 B2 | 6/2007 | Koselka et al. |
| 7,317,388 B2 * | 1/2008 | Kawabe et al. .......... 340/539.13 |
| 7,684,894 B2 * | 3/2010 | Sakai et al. ................... 700/245 |
| 2004/0017930 A1 | 1/2004 | Kim et al. |
| 2005/0218292 A1 * | 10/2005 | Kawabe et al. ............... 250/206 |
| 2006/0039587 A1 | 2/2006 | Yoon et al. |
| 2006/0126918 A1 | 6/2006 | Oohashi et al. |
| 2007/0061041 A1 * | 3/2007 | Zweig ........................... 700/245 |
| 2007/0198128 A1 * | 8/2007 | Ziegler et al. ................. 700/245 |
| 2007/0199108 A1 * | 8/2007 | Angle et al. ..................... 901/17 |
| 2009/0030552 A1 * | 1/2009 | Nakadai et al. ............... 700/258 |
| 2009/0177323 A1 * | 7/2009 | Ziegler et al. ................. 700/259 |
| 2009/0240371 A1 * | 9/2009 | Wang et al. ................... 700/259 |
| 2011/0172822 A1 * | 7/2011 | Ziegler et al. ................. 700/259 |
| 2011/0288684 A1 * | 11/2011 | Farlow et al. ................. 700/264 |
| 2011/0292193 A1 * | 12/2011 | Wang et al. ..................... 348/61 |

OTHER PUBLICATIONS

Roy, et al., "Towards Personal Service Robots for the Elderly", Retrieved at <<http://www.ri.cmu.edu/pub_files/pub2/roy_nicholas_2000_1/roy_nicholas_2000_1.pdf>>, Workshop on Interactive Robots and Entertainment, 2000, pp. 7.

Yang, et al., "A Real-Time Face Tracker", Retrieved at <<http://swing.adm.ri.cmu.edu/pub_files/pub1/yang_je_1996_1/yang_jie_1996_1.pdf>>, Proceedings of the 3rd IEEE Workshop on Applications of Computer Vision,1996, pp. 6.

(Continued)

*Primary Examiner* — Khoi Tran
*Assistant Examiner* — Jorge Peche
(74) *Attorney, Agent, or Firm* — Stephen Wight; Doug Barker; Micky Minhas

(57) ABSTRACT

A method is provided for initiating a telepresence session with a person, using a robot. The method includes receiving a request to host a telepresence session at the robot and receiving an identification for a target person for the telepresence session by the robot. The robot then searches a current location for a person. If a person is found, a determination is made regarding whether the person is the target person. If the person found is not the target person, the person is prompted for a location for the target person. The robot moves to the location given by the person in response to the prompt.

19 Claims, 6 Drawing Sheets

(56) References Cited

OTHER PUBLICATIONS

Ghidary, et al., "Human Detection and Localization at Indoor Environment by Home Robot", Retrieved at <<http://ieeexplore.ieee.org/xpl/freeabs_all.jsp?arnumber=886043>>, Proceedings of IEEE International Conference on Systems, Man, and Cybernetics, 2000, pp. 6.

Wong, et al., "A Mobile Robot That Recognizes People", Retrieved at <<http://ieeexplore.ieee.org/stamp/stamp.jsp?tp=&arnumber=479652>>, Proceedings of the Seventh International Conference on Tools with Artificial Intelligence, 1995, pp. 346-353.

Yamamoto, et al., "A Request of the Robot: An Experiment with the Human-Robot Interactive System HuRIS", Retrieved at <<http://ieeexplore.ieee.org/stamp/stamp.jsp?tp=&arnumber=253887>>, Proceedings of IEEE International Workshop on Robot and Human Communication, 1992, pp. 204-209.

Kleinehagenbrock, et al., "Person Tracking with a Mobile Robot based on Multi-Modal Anchoring", Retrieved at <<http://ieeexplore.ieee.org/stamp/stamp.jsp?tp=&arnumber=1045659>>, Proceedings of IEEE International Symposium on Robot and Human Interactive Communication, Sep. 25, 2002, pp. 7.

International Search Report for PCT/US2012/047089, dated Jan. 2, 2013, pp. 2 (English).

* cited by examiner

100

200

FINDING A CALLED PARTY

BACKGROUND

A "robot," as used herein, is an electro-mechanical device that includes computer hardware and software that allow the robot to perform functions autonomously. An example of a robot is a cruise missile that can be configured to fly to a particular target without being remotely guided. Sensors on the cruise missile can output data which is compared to internal databases to allow the cruise missile to adjust its flight pattern to ensure that the cruise missile reaches the intended target.

While the cruise missile is a military robot, consumer-level robots have been introduced to the market. For example, a vacuum cleaner has been configured with motors and sensors that allow the vacuum cleaner to autonomously vacuum a particular area and return to a charging station. In another example, robot lawnmowers have been introduced, wherein a user of the robot lawnmower defines a boundary and the robot lawnmower proceeds to cut grass in an automated fashion within the defined boundary.

Technologies have developed to enable some robots to be given instructions from remote locations. In other words, the robot can be in communication with a computing device that is remote from the robot, for example, by way of a network and the robot performs actions based on the instructions provided. This can be termed a "robotic telepresence," as a remote user participates in the environment in which the robot is located. In one type of robotic telepresence, a remote user may wish to communicate with a person in the robot's environment.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

The subject innovation relates to systems and methods for locating a person in an environment containing a robot and initiating communications through a robotic telepresence. An embodiment provides a system for conducting a telepresence session with a person in an environment using a robot. The system includes a motor, configured to move the robot through the environment, and a sensor system, including a camera and a microphone. A processor is configured to implement modules for a robot, wherein the modules include a navigation module that is configured to move the robot through the environment, a motion detection system that is configured to detect motion in the environment, and a sound source location module that is configured to locate a sound detected by the microphone. A facial recognition module is configured to identify that a face is present in an image from the camera. A person location module is configured to accept a designation of a target person and to use data from the sound source location module, the facial recognition module, or the navigation module, or any combinations thereof to locate the target person in the environment.

Another embodiment provides a method for initiating a telepresence session with a target person using an autonomous robot to locate the target person. The method includes receiving a request to host a telepresence session at the robot and receiving an identification for a target person for the telepresence session by the robot. The robot searches a current location for a person. If a person is found, the robot determines if the person is the target person and, if not, prompts the person for a location for the target person. The robot then moves to the location provided in an answer given in response to the prompt.

Another embodiment provides one or more non-volatile computer-readable storage media for storing computer readable instructions, the computer-readable instructions providing a system to locate a target person when executed by one or more processing devices. The computer-readable instructions include code configured to receive vocal commands, wherein the vocal commands instruct a robot to search for a person at a specific location, and code configured to move the robot to the specific location.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

DETAILED DESCRIPTION

Figure 1:
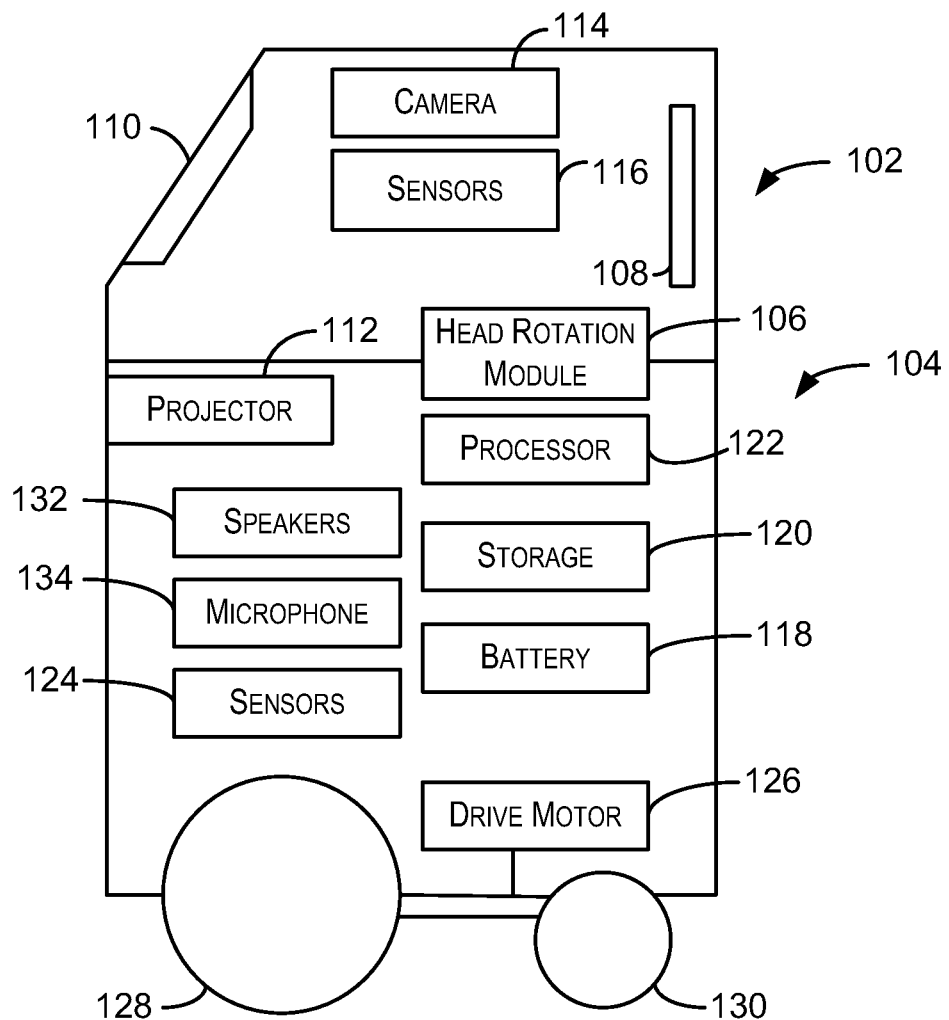
FIG. 1 is a schematic diagram of a robot that can be used in a robotic telepresence session.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

As used herein, a robotic telepresence session can provide a communication in which a remote user uses an application on a remote computing device to access a robot's video, audio, and sensory data with the ability to communicate with a target person through the robot. As used herein, a remote user can be located on a network different from the robot's network, for example, separated by the Internet, or can be located on a local network. The remote computing device can include a personal computer, mobile device, or game console, among many others. The application can be a standalone application in the remote computing device or can be accessed through a Web browser.

The robotic telepresence session can provide a remote user with an image of the robot's environment, including the target person. This may enhance the reality of the communications and, thus, create a more efficient and enjoyable communication experience. As a communications tool, the robotic telepresence session may provide a valuable technique for businesses, as well as helping persons far away from family and friends, such as astronauts, submariners, and soldiers, to feel as if they are closer to home.

However, a called party, or target person, might be unable to answer a telepresence request because the target person is not able to see, hear, or access the robot. Unless a target party is in the immediate presence of the robot, valuable time may be spent driving the robot through the environment looking for the target person.

In addition, it may be useful to dis-allow the calling party from driving the robot through the environment. For example, the called party may not want the caller to see into the caller's environment before the call is actually accepted. Further, the called party may not want the calling party to see whether the called party is actually available to accept the call.

To solve this problem, embodiments disclosed herein set forth an approach for autonomously locating a person in the environment. In the approach, the robot attempts to get closer to the called party, for example, by announcing a telepresence request, searching its environment for target persons (specific or not), and requesting assistance from persons in its environment. The robot uses automated navigation of the environment in combination with sensor data, such as facial identification, facial recognition, sound input, and vocal queries, to identify persons in the environment. The initiator of the telepresence session does not have to stay in constant contact with the robot, but may perform other activities while the robot searches for the person.

Once the robot has found the target person, it can inform the initiator and ask the target person if they wish to accept the communication, at which point the remote party initiating the communication is alerted and a communication channel is opened. If the robot is not asked to locate a specific person, the robot may designate the target person to be the first person found, and ask that person if they wish to accept the communication session. In either case, if the person refuses to accept the communication the robot can inform the remote user and terminate the robotic telepresence session.

FIG. 1 is a schematic diagram of a robot that can be used in a robotic telepresence session. The robot 100 includes a head 102 and a body 104, wherein the head 102 is movable with respect to the body 104. The robot 100 can include a head rotation module 106, which can include one or more motors that rotate the head 102 with respect to the body 104. For example, the head rotation module 106 can rotate the head 102 with respect to the body 104 up to 45° in either angular direction. In another example, the head rotation module 106 can rotate the head 102 90° in relation to the body 104. In another example, the head rotation module 106 can rotate the head 102 180° with respect to the body 104.

The head 102 can include an antenna 108 that is configured to receive and transmit wireless signals. For instance, the antenna 108 can be configured to receive and transmit Wi-Fi signals, Bluetooth signals, infrared (IR) signals, sonar signals, radio frequency (RF) signals, or any other suitable signals. In yet another example, the antenna 108 can be configured to receive and transmit data to and from a cellular tower. The robot 100 can send and receive communications with a remotely located computing device through the antenna 108.

The head 102 of the robot 100 can also include a display 110 for the display of data to an individual near the robot 100. For example, the display can be configured to display the name or a picture of a person the robot is attempting to locate. In another example, the display 110 can be configured to display an image of a remote user during a robotic telepresence session. The display may also display the current status of the telepresence session, such as "session started" or "session ended," among others. In an embodiment, the robot 100 may include a projector 112 configured to project an image of the remote user, adding to the reality of the telepresence session for the target person.

The head 102 of the robot 100 can include a camera 114 that is configured to capture sequential images of an environment of the robot, for example, of a target person during a telepresence session. The camera 114 may be any of a wide range of camera types, depending on system design considerations. Examples of cameras that may be used include still cameras, video cameras, infrared cameras, stereoscopic cameras or various other types of arrays of optical sensors. To increase the reality of the telepresence session for the remote user, the camera 114 can be a high definition video camera that facilitates capturing video data that is in, for instance, 720p format, 720i format, 1080p format, 1080i format, or other suitable high definition video format. The head 102 may also include a camera 114 that captures relatively low resolution data. This may allow a video connection over a more bandwidth limited connection, such as to a video display on a mobile phone. As the camera 114 is mounted in the head 102 of the robot 100, the head rotation module 106 can allow the camera 114 to capture video data of a relatively large portion of an environment of the robot 100, making a search for a target person more efficient.

The head 102 of the robot 100 may include sensors 116 that can aid the robot 100 in performing autonomous navigation. The sensors 116 may be of any suitable type. For example, the sensors 116 may include a depth sensor that is configured to determine a distance between the robot and an object, an infrared sensor, a camera, a cliff sensor that is configured to detect a drop-off in elevation proximate to the robot 100, a GPS sensor, an accelerometer, a gyroscope, or other sensor types.

The body 104 of the robot 100 may include a battery 118 that is operable to provide power to other modules in the robot 100. The battery 118 may be for instance, a rechargeable battery, such as a lead-acid battery, a gelled lead acid battery, a lithium ion battery, or a nickel-cadmium battery, among others. If the battery 118 is rechargeable, the robot 100 may include an interface that allows the robot 100 to be coupled to a power source, such that the battery 118 can be relatively easily provided with an electric charge.

The body 104 of the robot 100 can include storage 120 and a processor 122. The storage 120 can include any combinations of random access memory (RAM), read only memory (ROM), flash memory, hard drives, flash drives, or optical drives. As described in further detail with respect to FIG. 5, the storage 120 can store a plurality of modules that are executable by the processor 122, wherein the modules can control the operation of the robot 100. The processor 122 can be a single-core processor, a multi-core processor, or a computing cluster, for example, with different cores assigned to different functions. The processor 122 can be in communication with other units in the robot 100 by way of any suitable interface, such as a bus hosted by a motherboard. The processor 122 is utilized to process data received from the remote computer, as well as other units in the robot 100 to cause the robot 100 to perform in a manner desired by a remote user of the robot 100, for example, locating a target person and performing a robotic telepresence session. In some embodiments, the processor and modules used to implement the robotic telepresence may be located in a remote computer in contact with the robot over a wireless network.

In addition to the sensors 116 in the head 102 of the robot 100, the body 104 can also include sensors 124 that can be utilized in connection with autonomous or semi-autonomous navigation. For example, the sensors 124 can include sonar sensors, location sensors, infrared sensors, a camera, a cliff sensor, and/or the like. Data that is captured by the sensors 116 and 124 can be used by the processor 122 to autonomously navigate the robot 100, for example, to locate a target person and conduct the robotic telepresence session.

The body 104 of the robot 100 may include a drive motor 126 that is operable to drive one or more wheels 128 and 130 of the robot 100. For example, a large wheel 128 can be a driving wheel, while a small wheel 130 can be a steering wheel that can change the orientation of the robot 100. In some embodiments, each of the wheels 128 and 130 can have a steering mechanism and may be used together to change the orientation of the robot 100. Furthermore, while a single drive motor 126 is shown as driving both of the wheels 128 and 130, another drive motor can be used to drive the other of the wheels 130 or 128. Upon receipt of data from the sensors 116 and 124 or receipt of commands from the remote computing device, the processor 122 can transmit signals to the head rotation module 106 to control orientation of the head 102 with respect to the body 104, and to the drive motor 126 to control the orientation and position of the robot 100.

The body 104 of the robot 100 can include speakers 132 and a microphone 134. Audio data captured by way of the microphone 134 can be transmitted to the remote computing device by way of the antenna 108. Accordingly, a remote user can receive a real-time audio/video feed and can experience the environment of the robot 100 during a robotic telepresence session. The speakers 132 can be employed to output audio data to one or more individuals that are proximate to the robot 100. This audio data can be a request for the location of a target person, a request to the target person to initiate a telepresence session, an audio feed from a remote user during the telepresence session, or any number of other sounds.

The robot 100 is not limited to the configuration and functional units discussed above, but can be configured in a variety of different manners. For instance, the head rotation module 106 can include a tilt motor so that the head 102 of the robot 100 can both rotate with respect to the body 104 and also tilt in a vertical direction. In some embodiments, the robot 100 may not include a separate head 102 and body 104, but may have a single unified body. In this embodiment, the robot body can be turned to allow the capture of video data by way of the camera 114. In another embodiment, the robot 100 can have a unified body structure, but the camera 114 can have an associated motor that allows the camera 114 to obtain different views of an environment. Further, functional units that are shown to be in the body 104 in FIG. 1 can be placed in the head 102 of the robot 100 and vice versa.

Figure 2:
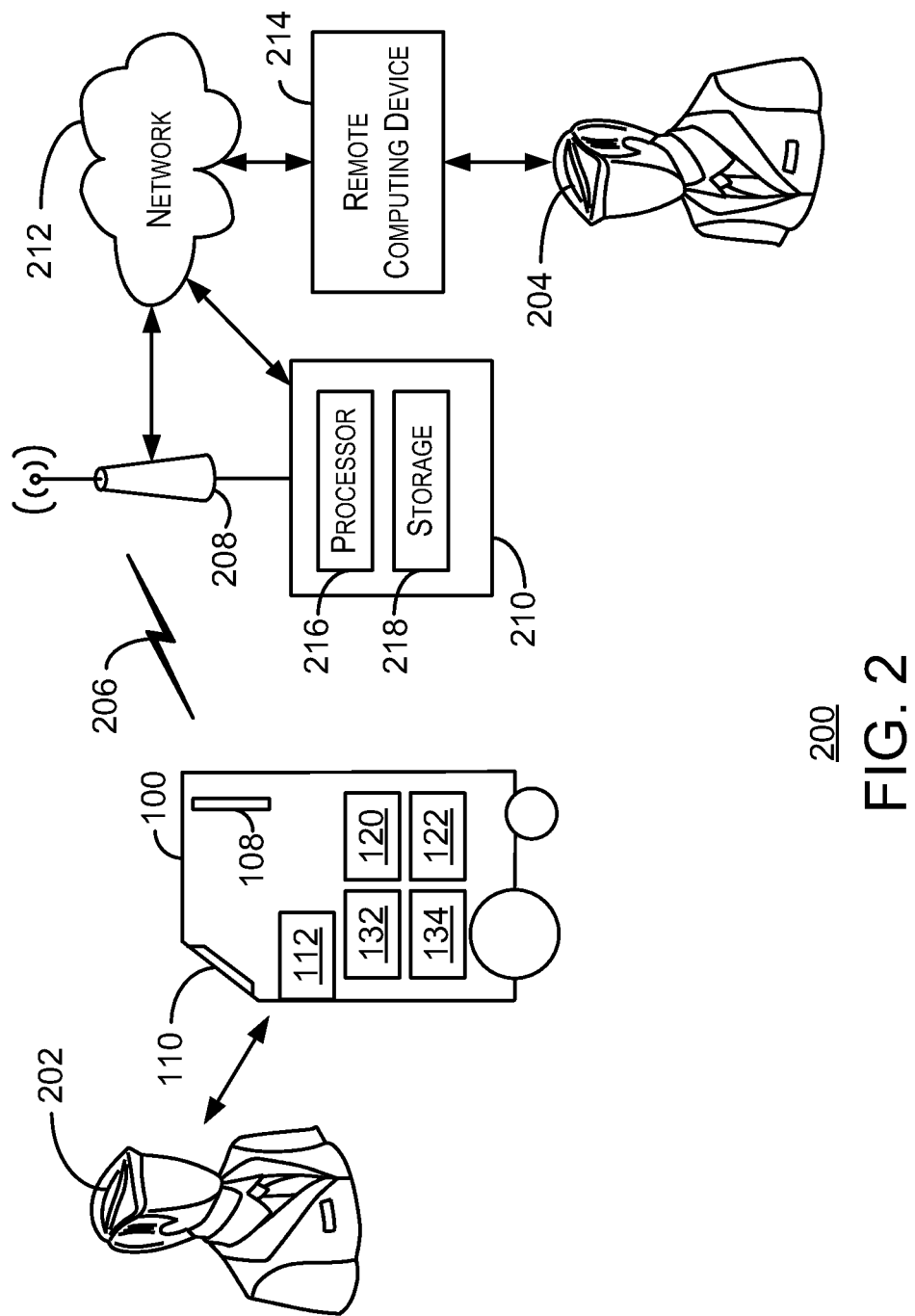
FIG. 2 is a drawing of a robotic telepresence session between a local user and a remote user.

FIG. 2 is a drawing of a robotic telepresence session 200 between a local user 202 and a remote user 204. Like numbers are as described for FIG. 1. The robot 100 can include the antenna 108 that is configured to receive and transmit data 206 wirelessly. In an exemplary embodiment, when the robot 100 is powered on, the robot 100 can communicate with a wireless access point 208 to establish its presence with the access point 208. Through the access point 208, the robot 100 can connect to a local computing device 210, for example, in the environment. The robot 100 can connect to a network 212, either directly or through the local computing device 210. For instance, the network 212 may be a cellular network, the Internet, a proprietary network such as an intranet or a virtual private network, or other suitable network. The communications session is not limited to using a local computing device 210 as the robot 100 may perform all of the functions itself.

The remote user 204 can start a telepresence application on a remote computing device 214. For a more realistic experience, the remote computing device 214 can be a computer with a large screen monitor, a virtual reality display, or a teleconference room, among others. In other embodiments, the remote computing device 214 can be a smaller unit, such as a desktop computer, a laptop computer, a tablet computer, a game system, or a mobile phone, among others. The remote computing device 214 connects to the local computing device 210 or directly to the robot 100, through the network 212. The remote computing device 214 can then request the telepresence session.

The modules that control the telepresence session may be stored in storage 120 on the robot 100, for example, loaded and executed by a processor 122 on the robot when a telepresence session is requested. In some embodiments, the modules may be run by a processor 216 in the local computing device 210, which can execute code from a storage device 218 on the local computing device 210. While not shown, the remote computing device 214 can include a display screen that can present data to the remote user 204 pertaining to the navigation of the robot 100, in addition to providing status reports on locating a local user 202, e.g., the target person for the telepresence session. For instance, during the search, the robot 100 may transmit a live audio/video feed to the remote computing device 214 by way of the network 212. Further, the remote user 204 may transmit navigation and telepresence commands to the robot 100 by way of the remote computing device 214 over the network 212.

In an embodiment, the remote user 204 can utilize the robot 100 to autonomously locate a local user 202 in an environment of the robot 100 for a telepresence session. Once the local user 202 is located and accepts the communication, the telepresence session may be started. A communication channel for the telepresence session can be established between the remote computing device 214 and the robot 100 by way of the network 212 through various actions such as handshaking, authentication, and the like. In one embodiment, a video telephone connection is established using a standard protocol, such as the H.264 SVC (Scalable Video Coding) standard. Any number of similar encoding schemes may be used in embodiments. The remote user 204 and local user 202 may then communicate through the telepresence session.

Figure 3:
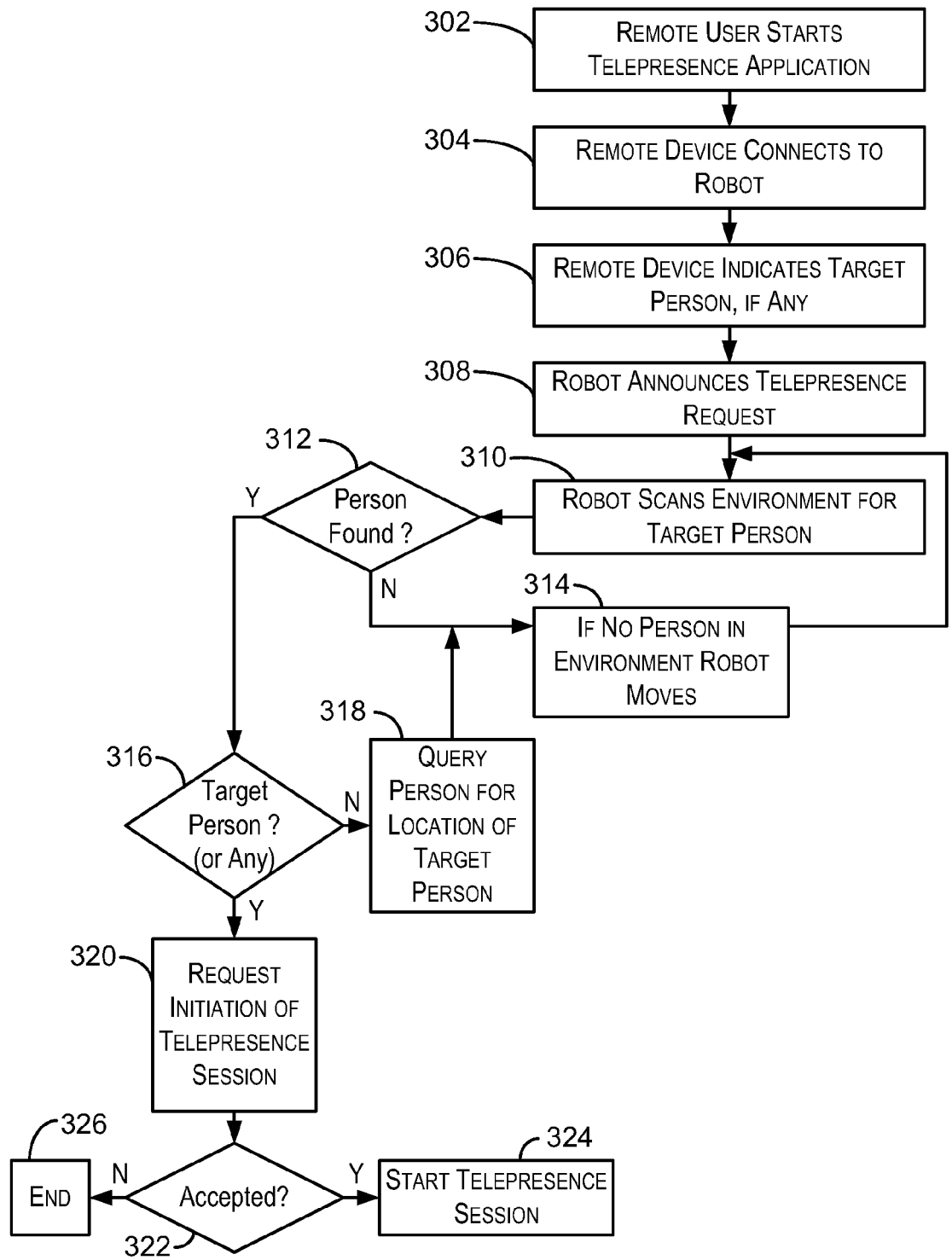
FIG. 3 is an overview of a method for locating a person in a robot's environment and establishing a robotic telepresence session for communications.

FIG. 3 is an overview of a method 300 for locating a person in a robot's environment and establishing a robotic telepresence session for communications. The method 300 is not limited to the functions shown as additional functions may be included. The method begins at block 302 when a remote user starts a telepresence application on a remote computing device, for example, as discussed with respect to FIG. 2. At block 304, the remote computing device establishes a connection to the robot. As discussed, the connection may be established directly with the robot or may be established through a computer that is local to the robot's environment, for example, functioning as a base station. Once the connection is established, the robot may load software to perform a telepresence session. At block 306, the remote user indicates if a specific person is targeted or if the first person that the robot encounters will work as the target person.

After the remote user initiates the session, the robot may start to take action. At block 308, the robot may announce the telepresence request, for example, audibly through a vocal announcement or tone, or visually, through a light, an alert on a screen, and the like. The selection of the announcement may be controlled by a local user, for example, setting a privacy setting or an evening setting that limits the alerts that may function. In some embodiments, a local user may request louder or enhanced alerts, for example, if expecting a telepresence session.

At block 310, the robot scans the environment for a person in its environment. This may be performed both visually and audibly. For example, the robot may identify a face in an image or may hear a vocal command, such as "over here." At block 312, if no person is found in the immediate environment, flow proceeds to block 314. At block 314, the robot moves to a new location, e.g., a destination, scanning for persons and listening for commands as it moves. If an object moves in front of the robot while it is moving from one location to the next, the robot can interrupt the motion and determine if the unexpected path interruption was caused by a person or an object, for example, by scanning for a valid face. If the interruption was caused by a person, the robot can engage the person. If the interruption was caused by an object the robot can move around the object and continue to the new location. Flow then returns to block 310, at which the robot scans the new location for a person.

If, at block 312, the robot finds a person in the immediate environment, process flow proceeds to block 316. At block 316, the robot determines if the person found is the target person. The determination may be made by facial recognition, for example, from a catalog of images, by vocal inputs, such as a confirmation that the person is the target person, or both. If, at block 316, the person found is determined not to be the target person, at block 318, the robot can query the person for the location of the target person. The robot can decode the response, for example, analyze the audio stream for phrases such as "he is out of the office," "she is in her office," "around the corner to the left" and similar phrases. Simpler phrases may also be used, such as "not here," "office," "kitchen," and the like. If the robot receives a location phrase, such as "office," the new location may be set as a navigation target, and process flow returns to block 314, at which the robot moves to the new location or destination, scanning for persons and listening for commands as it moves. The robot may ask for a confirmation of the input to ensure that the voice command was correctly interpreted.

If, at block 316, the robot determines that the person found is the target person, or if the target has been set to select the first person found, process flow proceeds to block 320. At block 320, the robot requests initiation of the telepresence session, for example, asking the target person "do you accept the telepresence session?" At block 322, the robot determines if the local user has accepted the telepresence session. For example, the local user may state phrases such as "robot accept," "robot decline" and the like, may press a button on the robot, or may send a command via a pendant control or a remote device, such as a mobile phone. If, at block 322, the robot determines that the telepresence session has been accepted, at block 324, the robot initiates the session and maintains the communications link until a party ends the link, for example, by pressing a button or giving a vocal command such as "robot end call."

If at block 322, the local user declines the telepresence session, process flow ends at block 326, at which the robot informs the remote user and terminates the communications link. As the robot ends the session, it may delete the modules used to conduct a telepresence session from RAM, for example, relying on the modules stored on disks for future telepresence sessions.

Figure 4A:
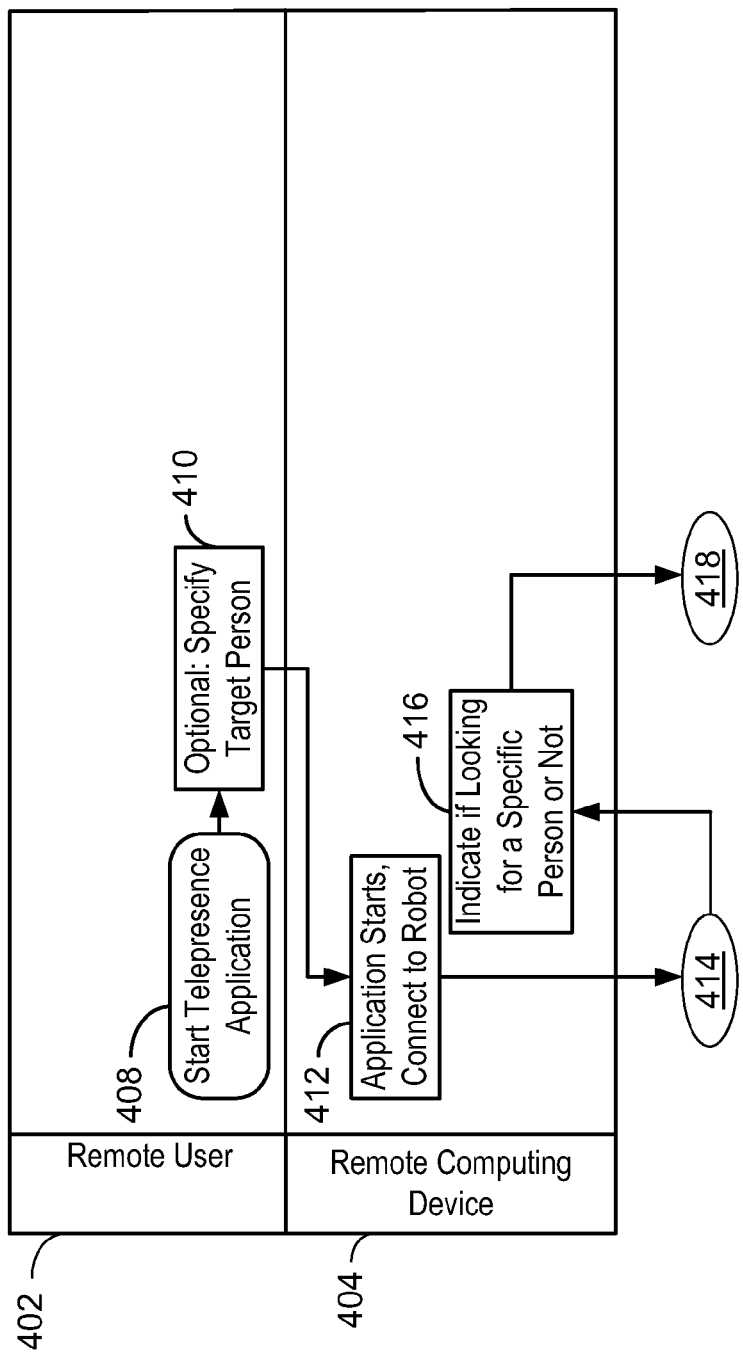
FIGS. 4A and 4B are block diagram providing a more detailed example of a method for locating a person in a robot's environment and requesting a robotic telepresence session for communications.
Figure 4B:
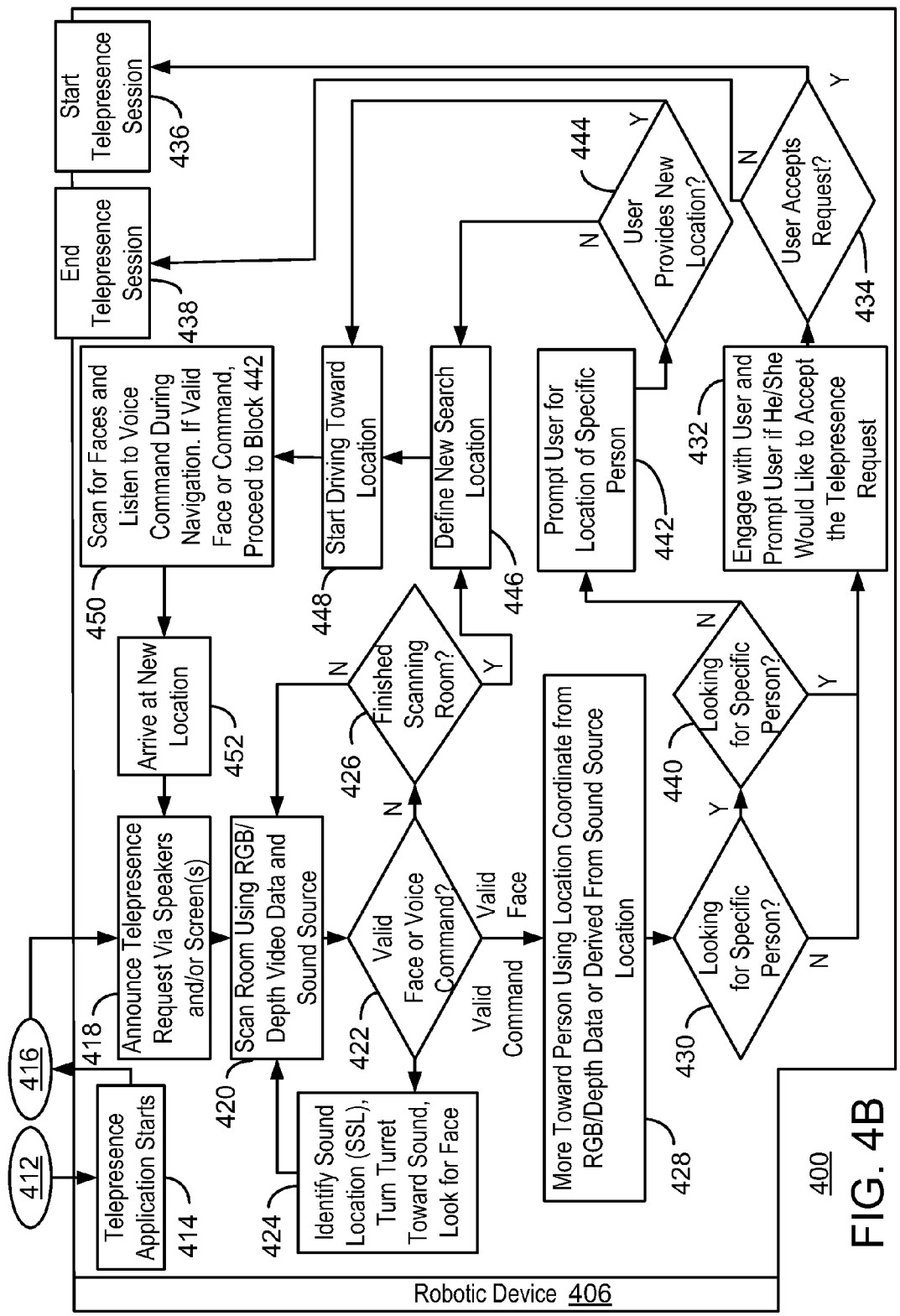

FIGS. 4A and 4B are block diagrams providing a more detailed example of a method 400 for locating a person in a robot's environment and requesting a robotic telepresence session for communications. The method 400 is divided into three sections indicating who is performing the function, i.e., FIG. 4A shows functions performed by the remote user 402 and the remote computing device 404, and FIG. 4B shows functions performed by the robot 406.

At block 408, a remote user 402 starts a telepresence application on a remote computing device 404, such as a personal computer, tablet computer, mobile phone, or game system, among others. At block 410, the remote user 402 indicates whether a specific person is targeted. For example, the remote user 402 may click on an icon with a picture of the target person or the application may ask the remote user if the remote user is targeting a specific person or any person at the location of the robot 406.

At block 412, the remote computing device 404 connects to the robot, via the internet, a mobile carrier network, or any other telecommunication network, as described above. At block 414, the telepresence application may be loaded and started on the robot 406 or a local computer. At block 416, the remote computing device 404 specifies to the robot 406 whether the robot 406 should look for a specific target person or if the first person encountered can accept the telepresence request.

At block 418, the robot 406 announces the telepresence request using its output devices, such as speakers, screens, projectors, lights, vibrators, and the like. At block 420, the robot 406 scans the room it is in from its current location and attempts to find a person, for example, by looking for movements, looking for a face, or listening for a particular voice command, such as "robot accept," "robot decline," or "over here." A valid human face is a human face that is detected by the robot's face detection algorithm.

If, at block 422, the robot 406 has identified a sound or command associated with persons, at block 424 the robot can turn the head, or turret, to face the sound and scan for a face. In an embodiment, the robot 406 may move toward the sound. Process flow the returns to block 420 to continue scanning the room.

If, at block 422, the robot 406 has not found either a face or sound in the immediate location, process flow proceeds to block 426. At block 426, a determination is made as to whether the robot 406 has finished scanning the room. If not, process flow proceeds to block 420 to continue scanning for a valid face or a voice command.

If, at block 422, the robot 406 finds a valid face, at block 428 it moves towards that face, for example, by using location coordinates derived from RGB image data, depth data, or derived from sound source localization (SSL) of a voice or voice command. Moreover, SSL may be used to determine that there are people in a different (for example, adjacent) room or other location. The search for the called person may proceed to the location indicated by SSL. The robot 406 engages with that person by facing him or her. If, at block 430, it is determined that the robot 406 is not looking for a specific person, i.e., the remote user instructed the robot 406 that the first person found was to be considered the target person, process flow prow proceeds to block 432.

At block 432, the robot 406 asks the person if they would like to accept the telepresence session. If at block 434 it is determined that the person has accepted the request, process flow proceeds to block 436 to start the telepresence session. If not, process flow proceeds to block 438, and the telepresence session request is terminated.

If, at block 430, it is determined that the robot 406 is looking for a specific person, at block 440, the robot 406 determines whether the person engaged with the robot 406 is that person. This may be performed by confirming the identity of the person through a facial recognition algorithm comparing the persons face to a database of persons likely to be in the environment. If the target person is identified, process flow proceeds to block 432, as discussed above. If the specific person is not identified at block 440, process flow proceeds to block 442.

At block 442, the robot 406 asks the person engaged with the robot 406 for the location of the target person. If, at block 444, the robot 406 determines that a new location has not been provided, process flow proceeds to block 446. Process flow also proceeds to block 446 if the robot 406 has finished scanning a room at block 426 without identifying a face. At block 446, a new search location is defined.

The new search location can be defined by using a simple movement algorithm, such as moving to the next room in a list or by proximity, such as moving to the nearest room. More complex algorithms can also be used, such as moving to the office of the target person or moving to a location that has the highest probability of meeting a person at a particular location based on that time of day. In the later case, the robot would need a database that tracks frequency of engagements with people based on location and time of day. The robot may use the database or other source of information to determine the last location that the target person was encountered and start the search at that location.

Another approach to finding the called party may include the use of information provided to the robot by a person who may be expecting a telepresence session or call to be initiated. For example, someone may explicitly tell the robot ahead of time that he/she is going to be in a certain location if anyone calls. The robot may then begin the search for the person at that location if a call or request for a telepresence session is received. Yet another approach to finding a called party may employ a heat map of the most likely places to encounter specific people. Decisions about where to search for a called party may include data from the heat map.

From block 446, or if a new search location was provided at block 444, process flow proceeds to block 448. At block 448, the robot 406 navigates to the new location. As indicated at block 450, the robot 406 scans for faces and listens for voice commands as it moves to the new location. If a valid face or voice command is sensed, the robot 406 stops and process flow proceeds to block 422 to handle the new input. At block 452, the robot arrives to the new location and process flow resumes at block 418 to repeat the search procedure. The robot repeats the search procedure for a pre-set amount of time or until a person is actually found. Further, if the target person does not wish to accept the telepresence session, or is not the target person, they may redirect the robot 406 to another location, propose another time, or send the robot 406 to another person.

Figure 5:
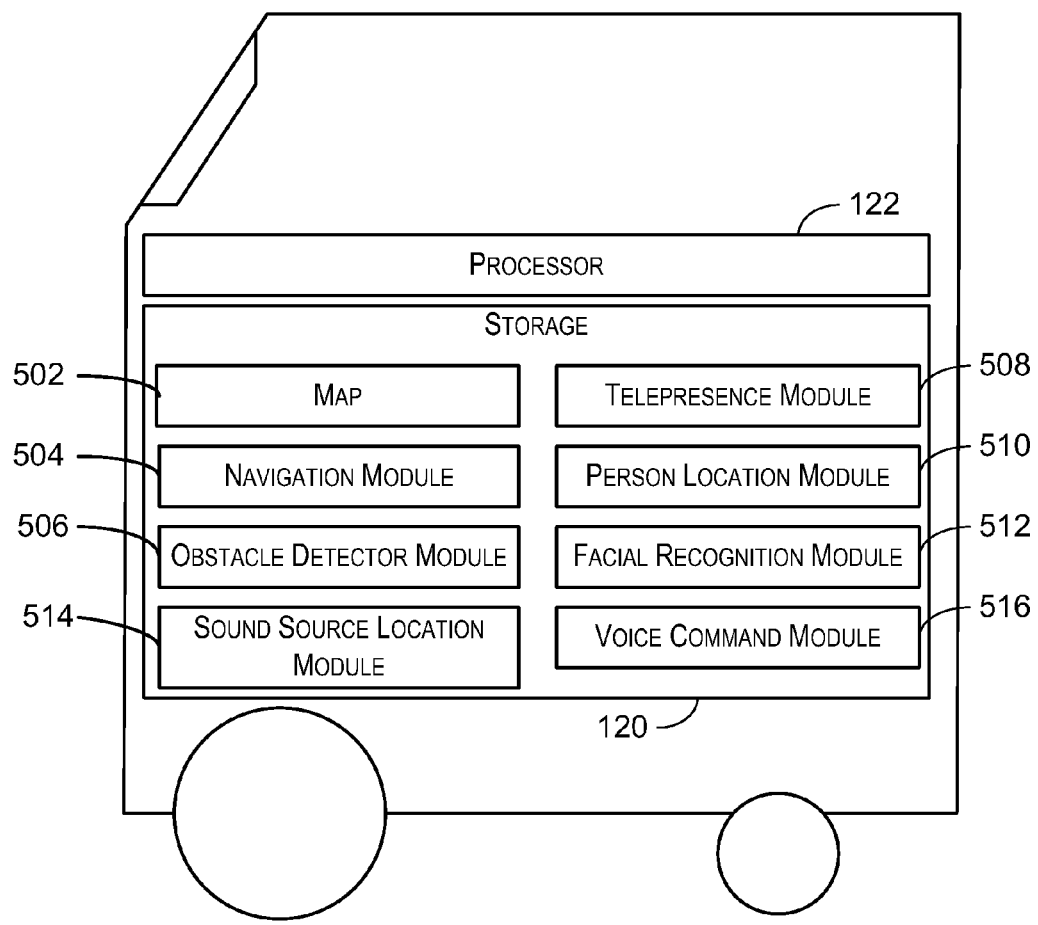
FIG. 5 is a block diagram of a robot showing modules that may be used to perform the location functions.

FIG. 5 is a block diagram of a robot 100 showing modules that may be used to perform the location functions. As described with respect to FIG. 1, the robot 100 includes storage 120 and a processor 122. As described with respect to FIG. 1, the storage 120 can include a non-volatile storage device that includes modules that are executable by the processor 122. The storage 120 can also include a map 502 of the environment, such as a directed graph in which each node represents a room and each edge represents an edge linking two rooms. The map 502 may include metric accurate information, such as a grid, a three dimensional point cloud, or any number of other representations of the environment. The map 502 can be generated by a user or may be automatically generated by the robot 100 through exploration of the environment, such as through a simultaneous location and mapping (SLAM) functionality or through a user directed walk navigation of the environment.

A navigation module 504 can use the information from the map 502 to locate the robot 100 and direct the robot 100 to a new location. For example, a target location may be determined from a vocal command provided by a person and the navigation module 504 may activate motors to move the robot 100 to the target location. The navigation module 504 can treat the target location as a node, and can compute a path from a current position of the robot 100 to the node. For instance, the map 502 can be interpreted by the robot 100 as a plurality of different nodes, and the location direction component 304 can compute a path from a current position of the robot 100 to the node, wherein such path is through multiple nodes.

In another embodiment, the navigation module 504 can compare the target location to the map 502 and identify coordinates corresponding to the target location to coordinates corresponding to the environment of the robot 100, for example, if the map 502 includes coordinates on a floor plan. The navigation module 504 can then cause the robot 100 to travel to the selected location. For example, the navigation module 504 can receive a vocal command from a person that includes a target location that is a tagged or untagged location in the map 502. The navigation module 504, when executed by the processor 120, can cause the robot 100 to travel from a current position in the environment to the location in the environment that corresponds to the selected location in the map 502.

As the robot 100 is traveling towards the selected location, one or more obstacles may be in a path that is between the robot 100 and the selected location. The obstacles may be permanent or temporary, such as if a person steps out of an office in front of the robot. An obstacle detector module 506 may steer the robot 100 around the obstacles, for example, preventing the robot 100 from hitting persons or other obstacles, falling down stairs, and the like. The storage 120 can include an obstacle detector module 506 that, when executed by the processor 122, is configured to analyze data received from the sensors 116 or 124 and detect the obstacles. Upon detecting an obstacle in the path of the robot 100 between the current position of the robot 100 and the selected location, the obstacle detector module 506 can output an indication that the obstacle exists as well as an approximate location of the obstacle with respect to the current position of the robot 100. A direction modifier component, for example, in the navigation module 504, can then alter the course of the robot 100 to avoid the obstacle. The navigation module 504 can thus be utilized in connection with autonomously driving the robot 100 to a location in the environment, for example, to locate a target person for a telepresence session.

The storage 120 may also include a number of modules that are loaded to support a telepresence session, such as a telepresence module 508. The telepresence module 508 is loaded when communications are initiated with a remote computing device that requests a teleconference session. The telepresence module 508 manages the telepresence session and the communications between the robot 100 and the remote computing device. The telepresence module 508 may activate other modules to perform specific functions, such as those discussed with respect to FIGS. 3 and 4.

For example, the telepresence module 508 may activate a person location module 510 to locate a person in the environment of the robot 100. The person location module 510 may use a facial recognition module 512 to identify valid faces in images from a camera and to identify specific persons by comparing the faces to a database. Any number of known facial recognition algorithms can be used, including geometric algorithms that compare distinguishing features of faces to those stored in a database, and photometric algorithms, that use statistical algorithms to compare a number or sequence of numbers representing an image to values in a database. Various recognition algorithms that may be used in embodiments include principal component analysis (PCA), linear discriminate analysis, elastic bunch graph matching, hidden Markov models, and neural networks, among many others.

The person location module 510 may call a sound source location (SSL) module 514 to identify a direction or location for a detected voice command. In an embodiment, the SSL module 514 uses a number of microphones in the robot 100 to triangulate a sound's location. In another embodiment, two microphones are used with a combination of various sound direction algorithms, including time differences, level differences, and phase differences between the microphones, spectral information, timing analysis, correlation analysis, and pattern matching, among others. The SSL module 514 is not limited to these algorithms, as any number of other techniques may be used in embodiments.

The person location module 510 may call a voice command module 516 to identify commands spoken to the robot. The voice command module 516 may use any number of known speech recognition algorithms to identify commands. For example, one algorithm that may be used in the voice command module 516 uses hidden Markov algorithms to recognize commands. The hidden Markov model can be used to recognize individual words based on the frequency distributions of short segments of sounds, for example, around 10 ms. Results of the hidden Markov model can be improved by various techniques, such as context dependency, among others. Another algorithm that may be used for speech recognition by the voice command module 516 is based on dynamic time warping, which measures similarities between two sequences.

Any number of other modules may be present in the storage 120 to implement or augment the functionality described above. For example, a motion detection module may be included. The motion detector module can use a camera feed, a sound feed, or any other sensor feed to identify a motion in the environment. In this case, the robot may move towards the location of the motion in the same way as towards as sound or command input. Upon reaching the location of the motion, the robot could scan for a face. Another module that that allow the robot 100 to be directly driven by the remote user may be present.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for conducting a telepresence session with a target person in an environment using a robot, comprising:
   a motor configured to move the robot through the environment;
   a sensor system comprising:
      a camera; and
      a microphone; and
   a processor configured to implement modules for a robot, wherein the modules comprise:
      a navigation module configured to move the robot through the environment;
      a facial recognition module configured to identify that a face is present in an image from the camera; and
      a person location module configured to accept a designation of a target person and to use data from the facial recognition module, or the navigation module, or any combinations thereof to locate the target person in the environment wherein the person location module is to:
      determine if a found person is the target person; and, if the person found is not the target person, the person location module is to:
         prompt the found person for a location of the target person; and
         move the robot to the location provided in an answer given in response to the prompt.

2. The system of claim 1, comprising a motion detection system configured to locate motion detected by the camera.

3. The system of claim 1, comprising a sound source location module configured to locate a sound detected by the microphone.

4. The system of claim 3, wherein the person location module is configured to instruct the navigate module to move the robot towards the location of the sound located by the sound source location module.

5. The system of claim 1, wherein the person location module is configured to provide a status of a search to a remote user.

6. The system of claim 1, comprising a speaker, wherein the person location module is configured to announce a request for a telepresence session through the speaker.

7. The system of claim 1, comprising a voice command module configured to translate a spoken phrase detected by the microphone into a command sequence for the robot.

8. The system of claim 7, wherein the command sequence is used to direct the navigation module to move the robot to a destination.

9. The system of claim 1, comprising a telepresence module configured to perform a robotic telepresence session between a remote user and a person in the environment of the robot.

10. The system of claim 1, wherein the processor is in a remote computer in communication with the robot.

11. The system of claim 1, wherein the processor is contained within the robot.

12. The system of claim 1, comprising a depth detection sensor configured to determine a distance between the robot and an object.

13. The system of claim 1, comprising an obstacle detection module.

14. A method for initiating a telepresence session with a target person using an autonomous robot to locate the target person, comprising:
   receiving a request to host a telepresence session at the robot;
   receiving an identification for a target person for the telepresence session by the robot;
   searching a current location for a person; if a person is found,
   determining if the person is the target person; and, if the person found is not the target person,
   prompting the person for a location for the target person; and
   moving the robot to the location provided in an answer given in response to the prompt.

15. The method of claim 14, comprising using facial recognition software to identify a person in an image.

16. The method of claim 14, comprising scanning for faces, listening for sounds, or both while moving to the location.

17. The method of claim 14, comprising:
   locating motion in the environment;
   moving the robot towards the position of the motion; and
   scanning for a face at the position of the motion.

18. The method of claim 14, comprising:
   locating a position of a sound;
   moving a turret to point a camera towards the sound; and
   scanning for a face at the position of the sound.

19. The method of claim 14, comprising:
   identifying that a sound comprises a command; and
   interrupting the motion to move towards the location of the command.

* * * * *